INVENTORS
RALPH H. SCHUMAN
CHARLES K. TAFT
BY Hudson, Boughton,
Williams, David & Hoffmann
ATTORNEYS

United States Patent Office 2,959,191
Patented Nov. 8, 1960

2,959,191

MACHINE TOOL WITH CONTOUR FOLLOWING APPARATUS

Ralph H. Schuman, Cleveland, and Charles K. Taft, Warrensville Heights, Ohio, assignors to The Warner & Swasey Company, Cleveland, Ohio, a corporation of Ohio Filed July 30, 1956, Ser. No. 600,908

16 Claims. (Cl. 137—623)

The present invention relates to servo mechanisms and, more particularly, to servo mechanisms especially suitable for use in machine tools to control the movement of a machine tool element, such as a tool slide, in accordance with a pattern or template.

The principal object of the present invention is to provide a new and improved servo mechanism, particularly a servo mechanism suitable for use in machine tools to cause the movement of a machine tool element such as a tool slide in accordance with a pattern or template, which servo mechanism has a high power output in response to a low power input and the frequency response of which is better than the servo mechanisms heretofore available for use in the manner contemplated.

Another object of the present invention is to provide a servo mechanism wherein a controlled member is held against movement by a balancing pressure of a predetermined magnitude in a fluid pressure chamber, which pressure is maintained by a pressure fluid flow, and is moved in one direction when a higher pressure, and in the other direction when a lower pressure, is present in the chamber and wherein flow control means is actuated to change the pressure in the chamber to cause movement of the controlled member and second flow control means is actuated in response to movement of the controlled member to cause a change in the pressure in a direction opposite to the change in pressure which produced the movement and to restore the pressure in the chamber to balancing magnitude after the controlled member has moved a distance corresponding to the original change in pressure.

Another object of the present invention is to provide a new and improved servo mechanism of the type referred to above in which a valve member or spool movable to control the connections of a hydraulic motor to pressure and drain respectively is biased in one direction by fluid pressure maintained at a substantially constant pressure acting on a first piston area, such as one end of the valve spool, and is biased in the opposite direction by fluid pressure in a second pressure chamber acting on a piston of larger area, such as the other end of the valve spool, and in which the movements of the valve spool are controlled by varying the lower pressure to shift the valve spool in either direction, the second-mentioned pressure preferably being varied by means of a torque motor which operates a vane to control the exhaust of pressure fluid from the second pressure chamber.

Another object of the present invention is to provide, in a new and improved servo mechanism of the type referred to, a torque motor which moves a vane to control the shifting movements of a controlled member in response to an electrical control signal applied to the torque motor and in which the movements of the vane cause the movement of a core member of a differential transformer to provide a follow-up signal which tends to move the vane to a position corresponding to the neutral position of the vane.

Yet another object of the present invention is to provide a new and improved control valve having a valve member or spool to be shifted in response to a signal in which the valve member is urged in one direction by fluid pressure in a first chamber acting on a first piston area, such as one end of the valve member, and maintained at substantially a constant pressure, and is urged in the opposite direction by fluid pressure in a second chamber acting on a second piston area, such as the other end of the valve member, larger than the first piston area, and in which the pressure in the second chamber is regulated in response to the signal to provide a force on the second piston tending to equalize, overcome, or yield to the force acting on the first piston area.

Still another object of the present invention is to provide a new and improved control valve of the type referred to in which conduit and orifice means is provided to place the first pressure chamber in communication with the second pressure chamber and in which the pressure fluid is introduced into the first pressure chamber and into the second pressure chamber by flowing from the first pressure chamber through the conduit and orifice means to the second pressure chamber.

Another object of the present invention is to provide a new and improved servo mechanism in which a controlled member which is urged in one direction by a substantially constant pressure in a first fluid pressure chamber and in the other direction by a pressure in a second fluid pressure chamber which overcomes, balances, or yields to the pressure of the first chamber and in which the pressure in the second chamber is varied to move the controlled member by movement of a controlling member to vary the amount of pressure fluid in the second chamber, the movement of the controlled member tending to restore the amount of pressure fluid in the pressure chamber to that necessary to establish the balancing pressure.

A further object of the present invention is to provide a servo mechanism or control valve, as set out above, in which the second chamber is connected to drain through a nozzle and the pressure in the second chamber is regulated by torque motor means actuated in response to an electrical signal to move a vane-type member toward and away from the nozzle to control the flow of pressure fluid therethrough.

A still further object of the present invention is to provide a servo mechanism or control valve of the types mentioned above wherein the first and second pressure chambers are placed in communication with each other by a bore in the member being controlled.

The present invention also contemplates as one of its objects the provision of a servo control mechanism, particularly suitable for moving a valve member or spool in accordance with the movements of a finger or stylus which follows the contour of a pattern or template, in which the stylus comprises a relatively rigid but yieldable plate-like member secured against movement at one end and backed by a member extending along a portion thereof adjacent the fixed end, the free end of the stylus being deflectable away from the backing member by relative movement between the stylus and the pattern.

As another object of the invention, it is contemplated to provide, in combination with the stylus referred to above, an electrical tube having an electrode thereof connected to the stylus so as to be movable therewith to provide a variable electrical signal.

The invention contemplates, as a further object, to provide a new and improved servo mechanism in which a variable outlet for a pressure chamber for controlling the movements of the controlled member comprises two outlet nozzles positioned on opposite sides of a vane member pivoted intermediate its ends and on opposite sides of the pivotal axis and in which the vane member is moved about its pivot to control the nozzles by signal-responsive means, preferably a torque motor having the vane member as the armature thereof.

The present invention resides in certain constructions and combinations of parts and further objects and advantages thereof will be apparent from the following detailed description of the preferred embodiment made with reference to the accompanying drawing in which.

Figure 1:
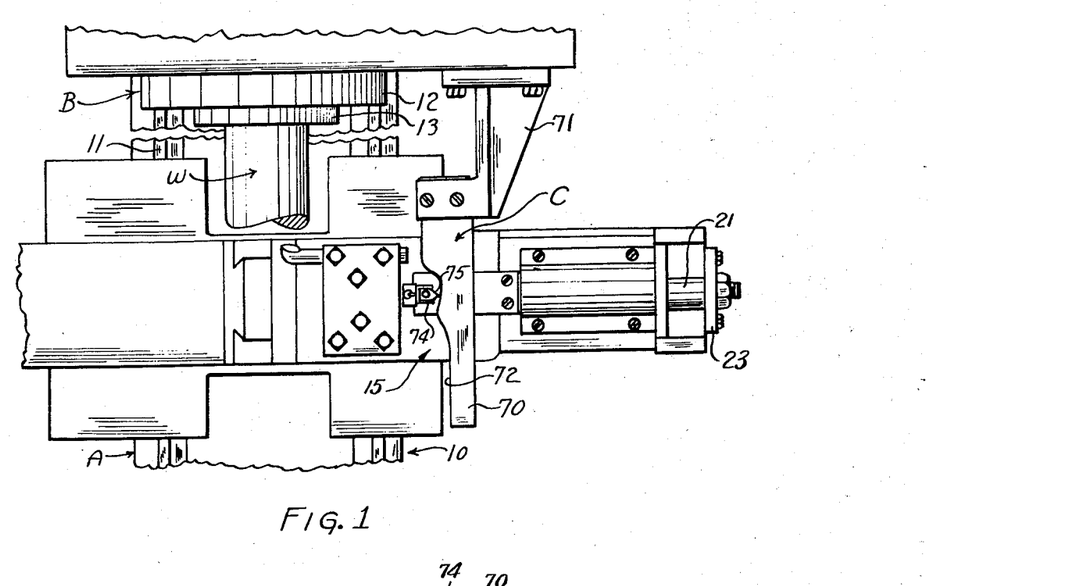
Fig. 1 is a fragmentary plan view of a machine tool embodying the present invention for controlling the movements of a tool slide in accordance with a pattern.
Figure 2:
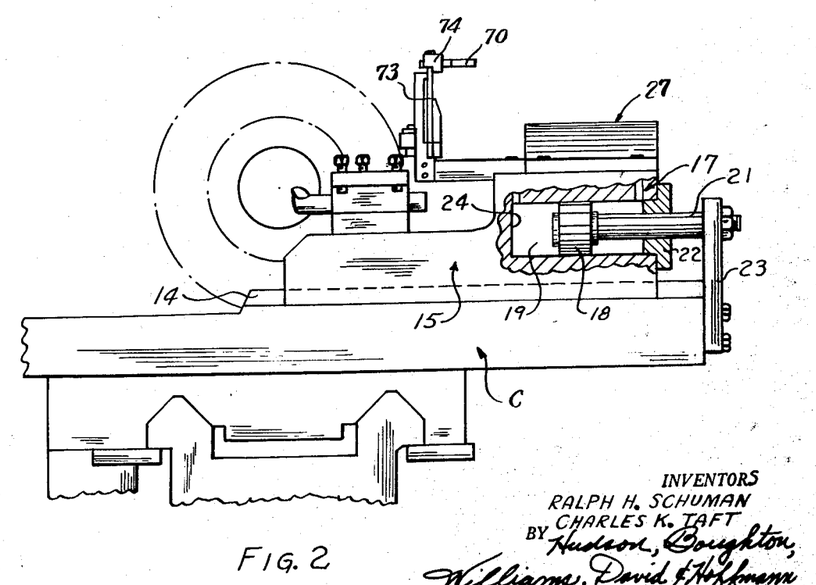
Fig. 2 is a fragmentary elevational view of a portion of the machine shown in Fig. 1.

Referring to the drawings, the present invention is shown as embodied in a lathe 10 having a bed A, a headstock B mounted at one end of the bed A, and a cross slide carriage C supported on the bed A by ways 11 for movement longitudinally of the bed. The headstock B rotatably supports a work spindle 12 which is driven to rotate a workpiece W secured to the work spindle 12 by a chuck 13. The cross slide carriage C has ways 14 thereon which support a tool slide 15 for movement transversely of the axis of the work spindle 12, the movements of the tool slide 15, as the carriage C is moved longitudinally of the workpiece W, controlling the machined shape of the workpiece.

The tool slide 15 is moved transversely of the workpiece W by a double acting fluid pressure actuator of the differential pressure type which comprises a piston 18 operable in a cylinder 19 formed by a bore in the tool slide 15. The piston divides the cylinder 19 into two pressure chambers 19a, 19b. A piston rod 21 is connected to the piston 18 and extends outwardly through the chamber 19b and an end 22 of the cylinder 19 and is connected at its outer end to the cross slide carriage C by a plate 23. The piston 18 is a stationary piston and the fluid pressure in the chamber 19b acting on the end 22 of the cylinder 19 acts through a smaller area than fluid pressure in the chamber 19a on the opposite side of the piston 18 and acting on the opposite end 24 of the cylinder. When the force acting on the end 24 of the cylinder 19 is greater than that acting on the end 22, the tool slide moves toward the workpiece, and when the force on the end 22 is greater, the tool slide moves away from the workpiece.

The chamber 19b is connected directly to the discharge of a pump 26 so that the pressure therein is maintained at a substantially constant pressure. The fluid connection, however, to the chamber 19a is under the control of a control valve 27 which has a neutral position where fluid pressure is trapped in the chamber 19a and is movable in one direction to connect the chamber 19a to the pump and in the other direction to connect the chamber 19a to drain.

The lathe as thus far described is of conventional construction and, per se, forms no part of the present invention. It will, therefore, not be described further and it is to be understood that the lathe, as described, is one machine in which the present invention is particularly useful, and that the invention is equally applicable to other types of machines and for controlling other members in accordance with a control signal.

The control valve 27, for controlling the connection of chamber 19a to drain and to the pump 26, includes a valve body 30 having a bore 31 therein. A valve spool or member 32 is axially slideable in the bore 31 to control the interconnections between a pressure port 33 connected to the pump 26 and a drain port 34 on one hand and a cylinder port 36 connected to the cylinder chamber 19a. The ports 33, 34, 36 are formed in the valve body 30 and communicate with the bore 31, the port 34 being adjacent the left-hand end of the valve member 32, as viewed in Fig. 3, and proceeding to the right, the ports 36, 33 communicate with the bore 31 in the order given. The valve member 32 has a land 38 formed at the left-hand end thereof which, when the valve member 32 is in a neutral position, blocks the port 34 but which uncovers the port to place the latter in communication with the cylinder port 36 if the valve member 32 is shifted toward the left thereby connecting the cylinder port 36 to drain. The valve member 32 also has a land 40 which normally blocks the pressure port 33 and which, when the valve member 32 is shifted to the right from its neutral position, uncovers the port 33 and places the latter into communication with the cylinder port 36 to connect the cylinder port to the pressure of pump 26. Since, when the valve 32 is in its neutral position, the cylinder port 36 is not in communication with either the port 33 or the port 34, the pressure fluid acting on the end 24 of cylinder 19 is trapped and the tool slide 15 cannot move. By shifting the control valve to the left, the pressure fluid acting on the end 24 of the cylinder 19 in the chamber 19a can escape to drain and the tool slide will move away from the workpiece, and when the valve member 32 is shifted to the right, the pressure fluid is supplied from the pump 26 through the port 36 and the tool slide 15 will move toward the work.

Figure 3:
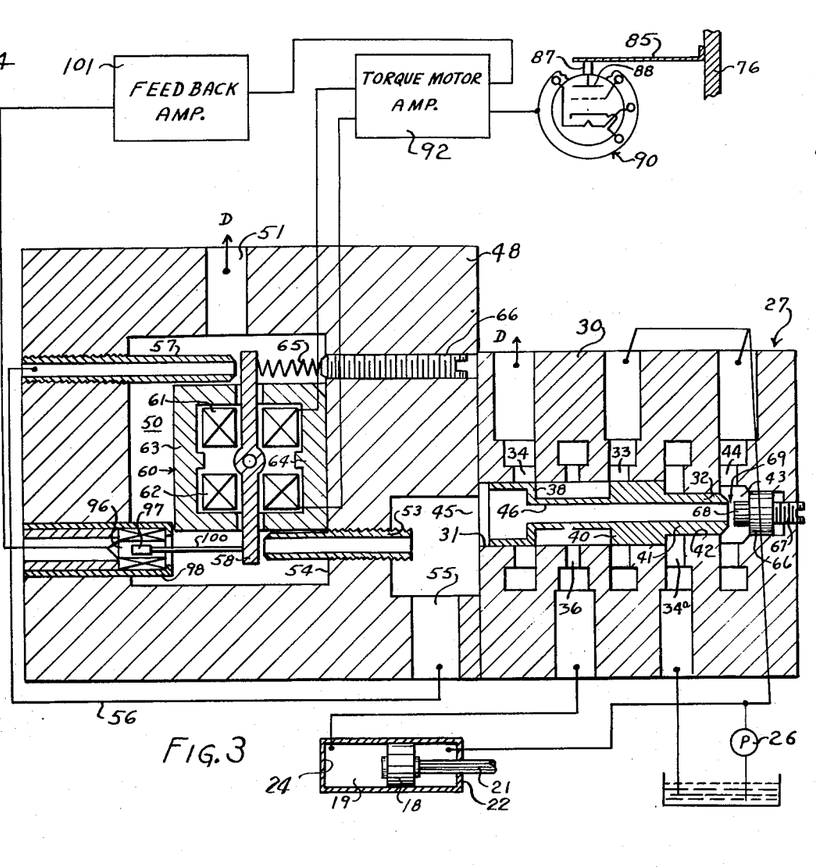
Fig. 3 is a sectional view of the control valve which is shifted to control the movements of the tool slide.

The lands on the valve member 32 have been described as blocking the ports controlled thereby when the valve member is in its neutral position. The lands, however, are preferably underlapped to provide a constant leakage flow thereby. It will be understood that such underlapping may be present whenever this specification states that fluid flow is blocked on describing the operation of the control valves.

The shifting movements of the valve member 32 are accomplished by controlling the forces due to pressure fluid acting on the opposite ends of the member. The right-hand end portion 41 of the valve member is of smaller diameter than the lands 38, 40 and is slidably received in a bore 42 of smaller diameter than the bore 31. The bore 42 communicates with the bore 31 at one end and with a pressure chamber 43 at its other end. The pressure chamber 43 is in communication with a pressure port 44 in the valve body, which port is connected to the discharge of the pump 26. The fluid pressure in the chamber 43 acts on the right-hand portion 41 of the valve member to urge the latter to the left, as viewed in the drawings. A drain port 34a communicates with an annular space in the valve body about the valve member 32 and is disposed intermediate the pressure chamber 43 and the pressure port 33. The port 34a provides a drain for pressure fluid which leaks along the shaft.

The pressure chamber 43 communicates with a control pressure chamber 45 at the left-hand end of the bore 42, as the latter is viewed in Fig. 3, through an axial bore 46 in the valve member 32. The pressure chamber 45 is formed in a block 48 which constitutes part of the control valve 27 but which is separate from the valve body 30. The block 48 and the valve body 30 are secured together in fluid-tight relationship to prevent fluid leakage from the chamber 45 and the bore 31 which open to each other. The land 38 forms the left-hand end portion of the valve member 32, and the pressure in the chamber 45 acts against the left-hand end of the valve member 32 to urge the valve member to the right, that is in a direction opposite to the direction which the pressure in the chamber 43 urges the valve member. The projected area of the left-hand end of the valve member 32 against which the pressure in the chamber 45 acts, is greater than the projected area of the right-hand end of the valve member upon which the pressure in chamber 43 acts. Preferably, the projected area of the left-hand end of the valve member is approximately twice the projected area of the right-hand end so that when the pressure in chamber 45 is one-half the pressure in chamber 43, the forces tending to shift the valve member 32 will balance each other and the valve member will remain in its immediate position. It can be seen, therefore, that by controlling the pressure in chamber 45, the valve member 32 can be shifted to the right, to the left, or held in a neutral position.

The pressure chamber 45, in the preferred embodiment, is controlled by controlling the flow to the sump or return reservoir for the pump 26. To this end, the block 48 is provided with a central chamber 50 connected to drain, or reservoir return, through a passageway 51. The control chamber 45 is connected to the chamber 50 through a nozzle 53 which extends from the chamber 45 through the wall portion between the chambers 45 and 50 and outwardly into the chamber 50 from a side wall 54 of the latter. The chamber 45 is also in communication with the chamber 50 through a passageway 55 formed in the block 48 between the chamber 45 and an exterior side of the block, an external conduit 56 connected at one end to the passageway 55 and at the other end to a nozzle 57 extending from externally of the block 48 into the chamber 50 through a side wall thereof opposite the side wall 54. The nozzle 57 is offset from the nozzle 53. The flow of pressure fluid from the chamber 45 and from the tubes 53, 57 into the chamber 50 is controlled by a plate-like member or armature 58 supported for rotation about an axis intermediate the nozzles 53, 57 and positioned intermediate the tubes 57, 53 so that opposite end portions thereof will simultaneously move toward, or away from, the nozzles 53, 57 upon rotation of the plate.

The armature 58 is preferably the armature of a torque motor 60. The torque motor 60 is of conventional construction and has a first field coil 61 encircling the armature 58 on one side of its axis of rotation, and a second field coil 62 encircling the armature on the other side of its axis of rotation. The armature 58 is positioned between two opposed permanent magnets 63, 64. Preferably, the armature 58 is supported by torsion rods lying along the axis of rotation of the armature. When the currents in the field coils 61, 62 are different, the reluctance of the flux path for the permanent magnetic flux between the poles of the opposed magnets and through the armature 58 is different adjacent the opposite end portions and the armature will rotate in one direction or the other, depending upon which field current is the larger.

From the drawing, it can be seen that if the armature 58 is rotated in a counterclockwise direction, the flow from the nozzles 53, 57 is restricted and the pressure will build up in chamber 45 and the latter will be shifted to the right. If, however, the armature or plate 58 is rotated in a clockwise direction, the flow from the nozzles 53 will be greater and the pressure will drop in the chamber 45 causing the valve to shift in the opposite direction. A spring 65 is positioned intermediate the end portion of the plate 58 adjacent to the nozzle 57 and the end of an adjusting screw 66 threaded into a bore in the block 48 opening into the side wall 54. The spring 65 overcomes the force of the fluid issuing from nozzles 57, 53 and acting against the plate 58 and urges the plate 58 about its axis in a direction which tends to move the plate toward the nozzles 53, 57.

The control valve 27 is provided with means to vary the flow of fluid into the control chamber 45 in response to movement of the valve member 32. When the valve member is shifted to the right as the result of an increase in pressure in control chamber 45 over that required to counterbalance the pressure in chamber 43, the flow to the chamber 45 is restricted in response to the movement of the valve, and when the valve member is shifted to the left, the flow is increased. To this end, the pressure chamber 43 has movably mounted therein a flow control member 66. The flow control member 66 is carried by a stud 67 threaded through an end wall of the chamber 43 and extending externally of the valve body 30. A portion 68 of the flow control member 66 is positioned opposite the opening of the bore 56 in the valve member 32, and the spacing between the portion 68 and the right-hand end of the valve member 32 forms a variable nozzle 69 which determines the flow of pressure fluid into the bore 46. When the valve member is shifted toward the right in response to a high pressure in the chamber 45, the spacing between the portion 68 and the valve member 32 becomes smaller restricting the flow of pressure fluid into the bore. When the valve member 32 is shifted in the opposite direction, it can be seen that the size of the variable orifice 69 will increase to permit an increased flow of fluid into the bore 46.

If the vane 58 is moved toward the nozzles 53, 57 to cause an increase in the pressure in chamber 45 to shift the valve member 32 to the right, the valve member will shift to a position where the opening between the portion 68 and the valve member 32 is such that the flow through the variable orifice 69 and the flow from the nozzles 53, 57 produce a pressure in chamber 45 which counterbalances the pressure in chamber 43. If the armature 58 is then moved away from the nozzles 53, 57, the pressure in chamber 45 will drop below that pressure necessary to counterbalance the pressure in chamber 43 and the valve will shift to the left to a position where the size of the opening between the portion 68 and the valve member 32 permits the flow necessary to maintain a pressure in the chamber 45 which counterbalances the pressure in the chamber 43 with the armature 58 in the particular position. From the foregoing, it can be seen that the valve member 32 has a position corresponding to each position of the armature 58 and follows the movements of the armature.

Figure 4:
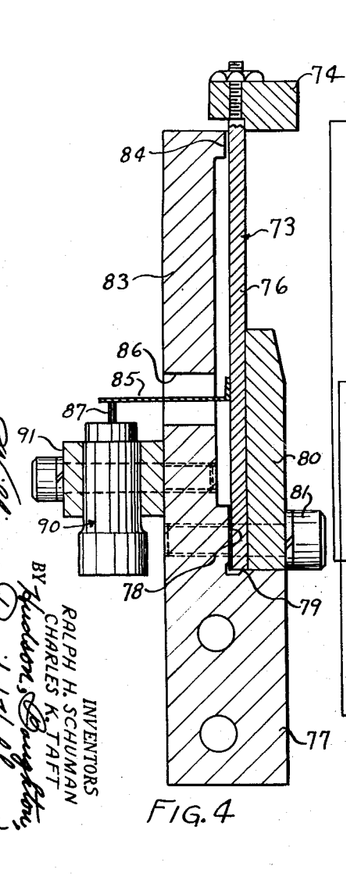
Fig. 4 is a sectional view of the stylus for following the pattern.

The armature 58 is actuated in response to electrical control signals to control the position of the valve member 32 and to thereby control the connection of the cylinder 19 adjacent the end 24 to pressure and drain. In the preferred embodiment, the movement of the armature or plate 58 are controlled by a pattern 70 supported from the headstock B by a bracket 71. The pattern 70 has a contoured edge 72 which has a shape determinative of the final form of the workpiece. A tracer finger or stylus 73 moves along the edge 72 as the cross slide carriage C moves longitudinally of the work and is actuated by a change in contour of the edge to cause an electrical signal to be transmitted to the torque motor 60. The stylus 73 comprises a feeler block 74 fixed to the end of a cantilevered plate-like feeler bar 76 and having sides 75 which taper away from a line of intersection which rides against the edge 72. The other end of the feeler bar 76 is fixed to a bracket 77 which, in turn, is fastened to the tool slide 15 so that the stylus 73 moves with the cross slide in a direction away from the pattern when the tool slide 15 is moved toward the workpiece, and in a direction toward the pattern when the tool slide is moved away from the workpiece.

The fixed end of the feeler bar 76 is clamped against one surface 78 of a stepped portion of the bracket 77 and the end of the feeler bar abuts the other surface 79 of the stepped portion. The feeler abr 76 is clamped against the surface 78 by a backing member 80 and a bolt 81 which passes through the backing member 80, the feeler bar 76, and threads into the bracket 77. The backing plate 80 extends along the feeler bar 76 from the fixed end thereof for approximately half, in the illustrated embodiment, of the length of the feeler bar.

The bracket 77 includes a portion 83 which extends along the feeler bar 76 on the side thereof opposite to the backing plate 80 and terminates in an abutment portion 84 extending inwardly toward the feeler bar 76. The abutment portion 84 is spaced from the feeler bar 76, and the free end of the feeler bar 76 is deflectable from its normal position where the feeler bar 76 is in engagement with the adjacent side of the backing plate 80 to a position where the feeler bar 76 is in engagement with the abutment portion 84.

Movement of the stylus 73 produces an electrical signal which controls the operation of the torque motor 60. In the preferred and illustrated embodiment, a member 85 extends at right angles from the side of the feeler bar 76 opposite to the backing plate 80. The member 85 projects through an opening 86 in the adjacent portion 83 of the bracket, and the outer end of the member 85 is connected to a stem 87 of a movable electrode 88 of an electric tube 90. The electric tube 90 is supported in the bore of a support member 91 bolted to the bracket 77. Movement of the outer end of the member 85 causes movement of the movable electrode 88 and a variation in the current passing through the tube 90. The tube 90 is a conventional tube and is used to control a signal current applied to the input grid resistor of an amplifier 92 for the torque motor 60.

The amplifier 92 is of a type having two outputs which vary inversely with respect to each other, one of the outputs being connected to the field coil 61 and the other output being connected to the field coil 62. For a given position of the stylus 73, the output current of the tube 90 will produce outputs of equal magnitude from the amplifier 92, and the armature of the torque motor will remain in a neutral position wherein the valve member 32 is positioned so as to block both the drain and pressure ports to the chamber 19a of the cylinder 19. If the output of the tube changes, one of the output currents will increase and the other will decrease causing the armature to rotate in one direction or the other depending on the direction of change. It can be seen, therefore, that the position of the stylus 73 controls the position of the valve member 32 and, in turn, the movements of the tool slide 15. When the stylus 73 moves in response to a change in contour of the pattern, the tool slide 15 will move in a direction to restore the stylus 73 to its neutral position, which is a deflected position intermediate the backing plate 80 and the abutment position 84, and when the stylus is returned to its neutral position, the output signal from the tube 90 will have restored the armature 58 and the valve member 32 to their neutral positions.

Preferably, a means is also provided for producing a signal dependent upon the position of the armature 58. In the illustrated embodiment, a signal is obtained from a differential transformer 96 having a split secondary connected in bucking relationship and coupled to the primary by a movable core 97 which is connected to the armature 58 by a rod 100. The differential transformer 96 is positioned within a sleeve 98 supported in a bore in the block 48, the sleeve 98 extending outwardly from a side wall of the chamber 50 opposite the nozzle 53. The output signal from the transformer 96 has a phase and magnitude dependent on the position of the armature 58 in relationship to its neutral position and is amplified by an amplifier 101. The signal from the transformer 96 is applied to the input of the amplifier 92 so that it tends to move the armature 58 toward its neutral position. The final position of the armature is determined by a net signal derived from the output of the differential transformer and the input from the stylus. The output current from the transformer 96 will also compensate for errors in the desired position of the armature 58 and stiffens the reaction of the armature to an input signal.

The described system is extremely fast in its response to deflections of the stylus 73 and a low power input produces a high power output. While the present invention has been embodied in a lathe, it can be used in other applications where a control member, such as the valve member 32, is to be moved in accordance with the movements of another member, such as the stylus 73 or the armature 58 of the motor 60. In addition, it will be understood that while a torque motor is particularly suitable as the means for moving the plate 58 to control the flow of pressure fluid from the chamber 45, other means, mechanical or electrical, could be provided. The response, however, in such a case may not be as fast as the response with a torque motor.

Figure 5:
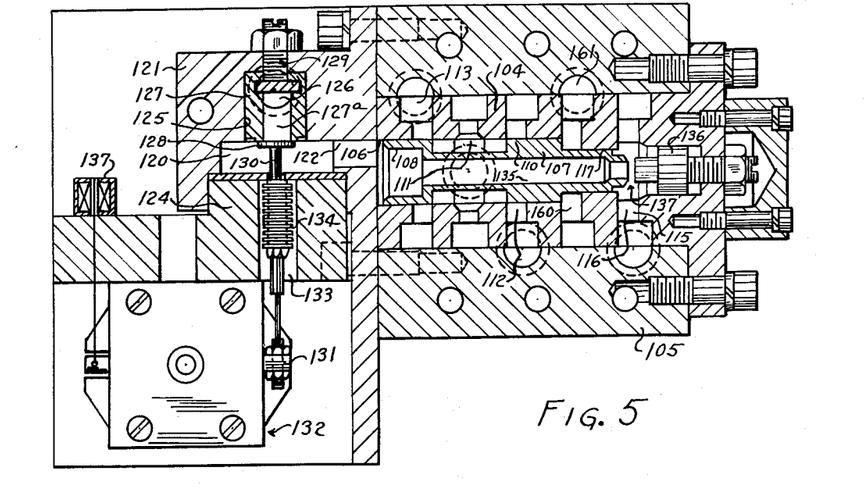
Fig. 5 is a sectional view of an alternative form of the control valve.
Figure 6:
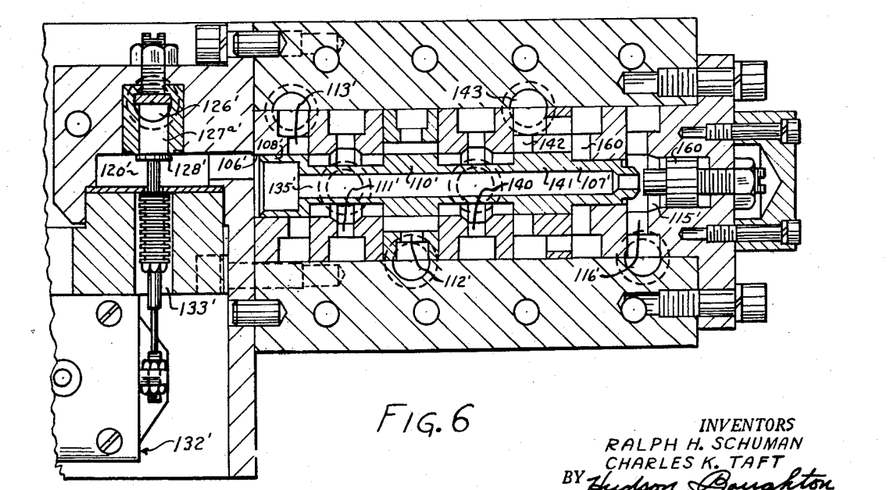
Fig. 6 is a sectional view of a valve similar to the valve shown in Fig. 5 but adapted to control two cylinders but of the four-way type.

Alternative forms of the invention are illustrated in Figs. 5 and 6 of the drawing. Referring to Fig. 5, the control valve shown therein comprises a valve sleeve 104 positioned in a bore of a valve body 105. The valve sleeve 104 includes a bore 106 therein in which a slideable valve member 107 operates. The slideable valve member 107 has lands 108, 110, thereon which closely fit the side wall of the bore 106 and which control the interconnection of a cylinder port 111 with a pressure port 112 and a drain port 113. The ports 111, 112, 113 are formed in the valve sleeve 104 and are connected to the cylinder chamber 19a, the source of fluid pressure, and to the sump through passageways in the valve body 105. The control valve is also constructed so as to provide a chamber 115 at one end of the valve sleeve 104, the right-hand end as the latter is viewed in Fig. 5, which chamber is continuously supplied with pressure fluid through a port 116 formed in the valve sleeve 104. The pressure in the chamber 115 acts on the projected area of the right-hand end of the valve member 107 and tends to shift the valve member to the left, as viewed in the drawings. The end portion of the valve member 107, which is subjected to the pressure of the chamber 115, is of smaller diameter than the diameter of the lands 108, 110 and is received in a bore 117 of reduced diameter extending between the bore 106 and the chamber 115.

The bore 106 opens in the left-hand side of the valve body 105, as the latter is viewed in Fig. 5, and communicates with a chamber 120 formed in a block 121 secured to the left-hand side of the valve body 105 in fluid-tight relationship therewith. A passageway 122 formed in the block 121 extends from the chamber 120 to the bore 106. The chamber 120, in the illustrated embodiment, is in the form of a bore extending at right angles to the passageway 122 and is counterbored at its outer end to receive a plug member 124 for closing the bore. The bore 125 has an annular member 127 positioned therein and providing a valve seat engageable by a valve member 128 to control the flow through the passage 125. The annular member has a bore 127a therein communicating with the opening 126 and is carried by a stud 129 which is threaded into the block 121 and extends outwardly therefrom. The position of the annular member 127 in the bore is adjustable by turning the stud 129.

The flow of fluid between the chamber 120 and the passageway 125 is controlled by a valve member 128 in the chamber 120. The valve member 128 is movable toward and away from the end of the passageway 125 to restrict or increase the flow into the passageway. The valve member 128 is fixed to one end of a rod 130 which passes through the plug member 124 and is connected at its outer end to the armature 131 of a torque motor 132. The rod 130 is positioned within a bore 133 in the plug member 124, and a bellows 134 is provided to form a seal between the rod 130 and the plug member 124. In addition to forming a seal, the bellows 134 counteracts the force of the pressure in chamber 120 acting on the back side of the valve member 128.

The torque motor 132 is supported by the plug member 124 and is of the same construction as the torque motor 60 of the first-described embodiment. The armature 131 has one end portion connected to the rod 130 and the opposite end portion connected to the movable core of a differential transformer 137.

Pressure fluid is supplied to the chamber 120 through an axial bore 135 in the slideable valve member 107 communicating with the chamber 115. The size of the inlet to the bore 135 is controlled by a flow control member 136 positioned in the chamber 115 opposite the end of the bore 135 and adjustable toward and away from the bore. The flow control member 136, together with the adjacent end of the valve member 107, forms a variable nozzle 137 which functions in the same manner as the variable nozzle 69 of the first-described embodiment.

The operation of the control valve shown in Fig. 5 is basically the same as the operation of the valve shown in Figs. 1 through 4. The pressure chamber 115 is continuously supplied with pressure fluid at the discharge pressure of the pump and the pressure in chamber 120 is varied to effect movement of the valve member 107. It will be noted that the effective piston area of the valve member 107, that is subjected to the fluid pressure of the chamber 120, is considerably greater, preferably twice as much, than the piston area subjected to the fluid pressure of chamber 115. The torque motor 132 moves the valve member 128 in accordance with electrical signals received thereby to increase or decrease the pressure in the chamber 120 to shift the valve member 107 to the right or left, respectively. When the valve member 107 shifts, the fluid flow into the bore 135 is changed by the action of the nozzle 137 to change the flow in the opposite direction to the direction of pressure change in the chamber 120. The differential transformer 137 provides a signal indicative of the movement and position of the armature 131 in the manner of the differential transformer 96.

Referring to Fig. 6, the valve shown therein is of substantially the same construction as the valve shown in Fig. 5 and the parts thereof have been given the same reference numerals with a prime attached thereto as the corresponding parts of Fig. 5. The valve of Fig. 6, however, has two outlet ports 111' and 140 which are connected to either drain or the source of fluid pressure upon the shifting movements of the valve member 107'. The valve member 107' has lands 108', 110' thereon for connecting the cylinder port 111' to drain when the valve is shifted to the left, and to the source of fluid pressure when the valve is shifted to the right. The land 108' controls a drain port 113' on the left-hand side of the cylinder port 111', as viewed in the drawing, and the land 110' controls the pressure port 112' positioned on the right-hand side of the cylinder port 111', as viewed in the drawing. The land 110', however, when the valve member is shifted to the left, moves so as to uncover the port 140 and to place the pressure port 112' into communication with the cylinder port 140 positioned to the right of the pressure port 112'. A land 141, located adjacent the right-hand end of the valve member 107', normally blocks a port 142 which is connected to drain through the drain connection 143, and when the valve member is shifted to the right, the land 141 moves so as to uncover the drain port and connect the cylinder port 140 to drain. It can now be seen that when the cylinder port 111' is connected to drain, the cylinder port 140 is connected to the source of fluid pressure and vice versa.

The shifting movement of the valve member 107' is effected by a torque motor 132' which moves a valve member 128' toward, and away from, a drain passage 125' from a chamber 120'. The chamber 120' is in communication with the bore 106' in which the valve member 107' operates, and the pressure in the chamber 120' acts against the projected area of the left-hand end of the valve member 107' to urge the valve member to the right, as viewed in the drawing. The right-hand end of the valve member 107' forms a piston which is subjected to pressure in a pressure chamber 115', the pressure chamber 115' being continuously supplied with pressure fluid from the pump through a pressure port 116'. The chamber 115' and the chamber 120' are interconnected through an axial bore 135' and nozzle in the valve member 107'.

The chamber 115' has adjustably supported therein a nozzle control member 136' which is adjustable toward, and away from, the adjacent end of the bore through the valve member 107' to control the flow of fluid through the bore and which functions to reduce the flow of fluid through the bore when the valve member moves toward the nozzle control member, and to increase the flow when the valve member moves away from the nozzle control member, as in the first-described embodiment.

Both of the control valves shown in Figs. 5 and 6 have an annular passage 160 about the valve member and formed in the valve sleeve inwardly of and adjacent to the pressure chamber 115 or 115' to collect leakage along the valve sleeve. In the embodiment of Fig. 5, the passage 160 is in communication with a drain port 161, and in the embodiment of Fig. 6, with the drain connection 143.

It can now be seen that the present invention provides a servo control mechanism having a fast response and a high power output in response to a low power input and that the control mechanism is especially suitable for use in operating a control valve for a tool slide to operate the tool slide in accordance with a pattern as the slide is moved longitudinally of the work and pattern. In addition, the present invention provides a control valve which has a slidable valve member urged in one direction by a substantially constant force provided by fluid pressure, preferably acting on the valve member, and is moved against the force or in the direction of the mentioned force, or balanced against movement by fluid pressure acting on a piston area at the opposite end of the valve member which is larger than the effective piston area through which the first-mentioned pressure operates. The pressure of the control chamber is preferably controlled by a torque motor which operates a vane in response to electrical signals from a stylus which follows the pattern to control the flow of pressure fluid from the control chamber. Fluid pressure is introduced continuously into the control chamber and is preferably introduced therein by means of a bore through the valve member which interconnects the constant pressure chamber with the control chamber. In addition, means is provided for reducing te flow into the control chamber in response to the movement of the valve, or other controlled member, in one direction and to increase the flow as the valve, or controlled member, moves in the opposite direction. Another feature provides a flollow-up movement for the member controlling the discharge from the control chamber in accordance with an electrical control signal. Furthermore, it can be seen that the invention provides a new and improved stylus for following the pattern which is particularly suitable for use with a signal circuit wherein an electrode is moved in order to provide a control signal.

While the preferred embodiment and modifications thereof have been described in considerable detail, further modifications, constructions and arrangements will be apparent to those skilled in the art to which the invention relates and it is hereby my intention to cover all such constructions, modifications and arrangements which fall within the scope of the appended claims.

Having thus described our invention, we claim:

1. In a servo mechanism, a movable member movable in either of two opposite directions from a neutral position, means for providing an electrical signal indicative of the direction and displacement from the neutral position of said movable member, torque motor means responsive to said signal and having a pivoted vane-like armature moved about its pivot in response to said signal in a direction dependent upon the direction of movement of the movable member, means responsive to the position of said armature to provide an electrical signal indicative of the direction and displacement of said armature from a neutral position corresponding to the neutral position of said movable member, means connecting the last-said signal to the torque motor means to render the last-mentioned signal effective to tend to return the armature to its neutral position, a controlled member to be moved in response to the first-mentioned signal, a pressure chamber controlling the movement of said controlled member, the pressure of the chamber determining the direction of movement of the controlled member, means for introducing pressure fluid into said chamber, and a nozzle communicating with said chamber and positioned adjacent said armature, said armature moving toward and away from the nozzle to control the fluid flow therethrough upon rotation in opposite directions respectively about its pivot.

2. In a servo mechanism, a movable member, means responsive to the movement of said member to provide an electrical signal indicative of the direction and magnitude of displacement of said member from a neutral position, torque motor means responsive to said signal and having a pivoted vane-like armature moved about its pivot in response to said signal in a direction dependent upon the direction of movement of the movable member, means responsive to the position of said armature to provide an electrical signal indicative of the direction and displacement of said armature from a neutral position corresponding to the neutral position of said movable member, means connecting the last-said signal to the torque motor means to render the last-mentioned signal effective to tend to return the armature to its neutral position, a controlled member to be moved in response to the first-mentioned signal, a pressure chamber controlling the movement of said controlled member, the pressure of the chamber determining the direction of movement of the controlled member, means for introducing pressure fluid into said chamber, a nozzle communicating with said chamber and positioned adjacent said armature, said armature moving toward and away from the nozzle to control the fluid flow therethrough upon rotation in opposite directions respectively about its pivot, and means actuated by the movement of said controlled member for tending to vary the pressure in said chamber in a direction to oppose the actuating movement of said control member.

3. In a machine tool, a fluid pressure motor for moving a controlled member, a control valve for controlling the connection of said motor to a fluid pressure supply and return system, said control valve having a valve body and valve member slideable in the valve body, said valve member having a neutral position where the connection of said motor to pressure supply and return is such that movement of the motor does not occur, first pressure responsive means for continuously urging said valve member in a first direction with a substantially constant first force, second fluid pressure responsive means urging said valve member in a second direction opposite to said first direction with a variable second force, means for supplying pressure fluid to said second fluid pressure responsive means including means actuated by movement of said valve member in the direction of said second force to restrict the supply of pressure fluid to said second fluid pressure responsive means and in the opposite direction to increase the supply of pressure fluid, means for varying the pressure in said second fluid pressure responsive means in either direction from a predetermined magnitude necessary to counterbalance said first force to cause movement of said valve member in either direction from its neutral position comprising a nozzle connecting said second fluid pressure responsive means to fluid return, a vane member having a neutral position and movable toward and away from the nozzle for varying the flow therethrough, means providing an electrical signal having characteristics indicative of the direction and the magnitude of the desired displacement of the controlled member, electrical means responsive to said signal for moving said vane member from a neutral position, and means responsive to the position of said vane member for applying a signal to said electrical means tending to return said vane member to its neutral position when displaced therefrom.

4. In a mechanism of the character described, a body having a bore therein, a controlled member axially slideable in said bore, means defining first and second pressure chambers respectively adjacent opposite ends of the bore and communicating with the bore, said controlled member having a first end portion adjacent to said second chamber and a second end portion adjacent said first chamber, said second end portion having a smaller cross-sectional area than the first end portion, means for introducing fluid under pressure into said first chamber and for maintaining a substantially constant pressure therein, said controlled member having a bore therein placing said chambers in communication with each other and for conducting pressure fluid from said first chamber to said second chamber, and means for controlling fluid flow to control the pressure in said second chamber comprising an outlet nozzle for said chamber, and signal responsive means for varying the flow through said outlet nozzle comprising a movable vane member having a neutral position and movable therefrom toward and away from said nozzle to vary the pressure on said second chamber in response to a signal having characteristics indicative of the desired direction and displacement of said movable vane member from its neutral position and signal producing means responsive to the position of said vane member and connected to said signal responsive means to provide a signal tending to return said movable vane member to its said neutral position when displaced therefrom.

5. In a mechanism of the character described a body having a bore therein, a controlled member axially slideable in said bore, means defining first and second pressure chambers respectively adjacent opposite ends of the bore and communicating with the bore, said controlled member having a first end portion adjacent to said second chamber and a second end portion adjacent said first chamber, said second end portion having a smaller cross-sectional area than the first end portion, means for introducing fluid under pressure into said first chamber and for maintaining a substantially constant pressure therein, said controlled member having a bore therethrough placing said chambers in communication with each other and for conducting pressure fluid from said first chamber to said second chamber, means for controlling fluid flow to control the pressure in said second chamber comprising an outlet nozzle for said chamber, and signal responsive means for varying the flow through said outlet nozzle, the last-said means including a vane movable from a neutral position toward and away from the nozzle to increase and decrease the pressure in said second chamber respectively and torque motor means for actuating said vane, said vane constituting the armature of said torque motor, means for applying a signal to said torque motor having characteristics indicative of the desired direction and displacement of said controlled member, and means responsive to the direction and magnitude of displacement of said vane to apply a signal to said torque motor means tending to return said vane to its said neutral position when displaced therefrom.

6. In a servo mechanism, a body having a bore therein, a controlled member axially slideable in said bore, means defining first and second pressure chambers respectively adjacent opposite ends of the bore and communicating with the bore, said controlled member having a first end portion adjacent to said second chamber and a second end portion adjacent said first chamber, said second end portion having a smaller cross-sectional area than the first end portion, means for introducing fluid under pressure into said first chamber and for maintaining a substantially constant pressure therein and for maintaining a fluid flow through said second chamber, said controlled member having an axially extending bore therein placing said chambers in communication with each other and for conducting pressure fluid from said first chamber to said second chamber, flow-restricting means for controlling fluid flow through said bore in said controlled member, said flow-restricting means comprising a member in said first chamber aligned with the bore in the controlled member and displaced axially from the end portion of said controlled member adjacent said first chamber to form therewith a nozzle the effective area of which is varied by the movement of said controlled member, and means responsive to a signal for controlling said fluid flow to control the pressure in said second chamber.

7. In a servo mechanism, a body having a bore therein, a controlled member axially slideable in said bore, means defining first and second pressure chambers respectively adjacent opposite ends of the bore and communicating with the bore, said controlled member having a first end portion adjacent to said second chamber and a second end portion adjacent said first chamber, said second end portion having a smaller cross-sectional area than the first end portion, means for introducing fluid under pressure into said first chamber and for maintaining a substantially constant pressure therein, said controlled member having an axially extending bore therein placing said chambers in communication with each other and for conducting pressure fluid from said first chamber to said second chamber, and flow-restricting means for controlling fluid flow through said bore in said controlled member, said flow-restricting means comprising a member in said first chamber aligned with the bore in the controlled member and displaced axially from the end portion of said controlled member adjacent said first chamber to form therewith a nozzle the effective area of which is varied by the movement of said controlled member, and means responsive to a signal for controlling said fluid flow to control the pressure in said second chamber comprising an outlet nozzle for said second chamber and means for varying the flow through said outlet nozzle.

8. In a servo mechanism, a body having a bore therein, a controlled member axially slideable in said bore, means defining first and second pressure chambers respectively adjacent opposite ends of the bore and communicating with the bore, said controlled member having a first end portion adjacent to said second chamber and a second end portion adjacent said first chamber, said second end portion having a smaller cross-sectional area than the first end portion, means for introducing fluid under pressure into said first chamber and for maintaining a substantially constant pressure therein and for maintaining a fluid flow through said second chamber, said controlled member having a bore therein placing said chambers in communication with each other and for conducting pressure fluid from said first chamber to said second chamber, and flow-restricting means for controlling fluid flow through said bore in said controlled member, said flow-restricting means comprising a member in said first chamber aligned with the bore in the controlled member and displaced axially from the end portion of said controlled member adjacent said first chamber to form therewith a nozzle the effective area of which is varied by the movement of said controlled member, means responsive to a signal for controlling said fluid flow to control the pressure in said second chamber comprising an outlet nozzle for said chamber and means for varying the flow through said outlet nozzle, the last-said means including a vane movable toward and away from the nozzle to increase and decrease the pressure in said second chamber respectively and torque motor means for actuating said vane, said vane constituting the armature of said torque motor, signal means for energizing said torque motor to actuate said vane, means responsive to the position of said vane to provide a feed back signal indicative of the direction and displacement of the vane from a neutral position, and means connecting said means which provide a feed back signal to said torque motor whereby said feed back signal tends to return said vane to its neutral position.

9. In a servo mechanism, a control valve comprising a valve body having a bore therein and fluid distribution ports opening into the bore, a controlled valve member axially slidable in said bore for controlling the distribution of fluid between said ports, means defining first and second pressure chambers respectively adjacent opposite ends of the bore and communicating with the bore, said valve member including portions preventing said first chamber from being placed in communication with said ports, the end portion of said valve member adjacent to said first chamber being of reduced diameter and having a smaller cross-sectional area than the end portion adjacent to said second chamber, means for introducing fluid under pressure into said first chamber and for maintaining a substantially constant pressure therein including a pressure port in said valve body communicating with said first chamber, means for providing a flow of pressure fluid to establish a pressure in said second chamber including conduit means formed by a bore in said valve member and communicating with said first and second chambers, flow-restricting means for controlling fluid flow through said bore in said valve member, said flow-restricting means being actuated on movement of said valve member toward said first chamber to restrict the flow through the bore in said valve member and to permit increased flow on movement in the opposite direction, and means responsive to a signal for varying the pressure in said second chamber by varying said fluid flow for establishing a pressure in said second chamber.

10. In a servo mechanism, a servo controlled valve for controlling the operation of a hydraulic motor, said valve having fluid distribution ports and a valve member to be moved in either of two opposite directions in accordance with a signal for controlling the distribution of fluid to said ports, first and second fluid pressure chambers adjacent said valve member, means for introducing pressure fluid into said chambers and for maintaining a substantially constant pressure in said first chamber, first piston means subject to the pressure of the fluid in said first chamber for providing a force tending to move said valve member in one of said directions, second piston means of different area than said first piston means and subject to the pressure of the fluid in said second pressure chamber for providing a force tending to move said valve member in the other of said directions, means for varying the pressure in said second chamber comprising an outlet nozzle communicating with the second chamber, a vane member positioned opposite said outlet nozzle and movable toward and away from the nozzle to respectively increase and decrease pressure in said second chamber, torque motor means for moving said vane member in response to electrical signals, means responsive to the movement of said vane member to provide an electrical signal indicative of the position of the vane, and means connecting the last-said signal to said torque motor.

11. In a servo mechanism, a controlled member movable in either of two opposite directions, a fluid pressure chamber adjacent one end of said member the fluid pressure therein controlling the movement of said controlled member, conduit means for introducing pressure fluid into said chamber and including first flow control means having a moving element actuatable to vary the effective size of said conduit means, an outlet connection for said chamber including second flow control means having a movable element actuatable to vary the effective size of the outlet connection, signal controlled means for actuating movable element one of said flow control devices from a neutral position to change the pressure in said chamber in accordance with a signal, the other of said flow control devices being actuated in response to the movement of said controlled member to change the flow therethrough in a direction to oppose the actuating movement of the controlled member and in an amount dependent upon the displacement of the controlled member, means responsive to the displacement of the movable element of said one of said control devices and providing a feedback signal indicative of the direction and magnitude of displacement of the movable element from its neutral position, and means for applying said feedback signal to said signal controlled means to tend to actuate the signal controlled means to return the movable element of said one of said flow control devices to its neutral position.

12. In a servo mechanism, a movable member movable in either of two opposite directions from a neutral position, means providing an electrical signal indicative of the direction and displacement from the neutral position of said movable member, motor means responsive to said signal and having a movable element actuated from a neutral position in response to said signal and in a direction dependent upon the direction of movement of the movable member from its neutral position, means responsive to the position of said movable element to provide an electrical signal indicative of the direction and displacement of said movable element from its neutral position corresponding to the neutral position of said movable member, means for applying the last said signal to the motor means to render the last said signal effective to tend to return the movable element to its neutral position, a controlled member to be moved toward and from a neutral position in response to the first mentioned signal, a pressure chamber controlling the movement of said controlled member, the pressure of the chamber determining the direction of movement of the controlled member, means for introducing pressure fluid into said chamber, and an outlet nozzle communicating with said chamber and positioned adjacent said movable element, said movable element moving toward and away from the nozzle to control the fluid flow therethrough when moved respectively in opposite directions from its neutral position.

13. In a servo mechanism, a control valve for controlling the operation of a hydraulic motor, said valve having fluid distribution ports including pressure, load and drain ports which open into a bore in the valve and a valve member movable in the bore in either of two opposite directions from a neutral position to control said ports and the distribution of fluid by said valve, said valve member having land means thereon for controlling the fluid flow between said ports and having a neutral position in said bore wherein said land means blocks fluid flow between said ports and movable in one direction from said neutral position to provide a fluid path through said bore to connect said load port to said drain port and in the other direction from said neutral position to provide a fluid path through said bore to connect said load port to said pressure port, means providing a first pressure chamber adjacent said valve member, means providing a second pressure chamber separate from said fluid paths and adjacent said valve member and preventing communication through said bore of said second chamber with said fluid paths through said bore, means for introducing a pressure fluid into said first chamber and for maintaining substantially constant pressure in said first chamber and for establishing a flow of fluid through said second chamber to provide a pressure therein which is a function of the rate of fluid flow therethrough including a port separate from said distribution ports and opening into said second chamber, first piston means subject to the pressure of fluid in said first chamber for providing a force tending to move said valve member in one of said directions, second piston means of different area than said first piston means and subject to the pressure of the fluid in said second pressure chamber for providing a force tending to move said valve member in the other of said directions, means for varying the rate of fluid flow through said second chamber to vary the pressure therein comprising means responsive to the position of said valve member to vary the rate of fluid flow through said second chamber in a manner dependent upon the position of said valve member for substantially the range of operation of said valve member and increasing the rate of flow when said valve member is moved in one direction and decreasing the rate of flow when said valve member is moved in the other direction.

14. In a servo mechanism, a control valve for controlling the operation of a hydraulic motor, said valve having fluid distribution ports including pressure, load and drain ports which open into a bore in the valve and a valve member movable in the bore in either of two opposite directions to control said ports and the distribution of fluid by said valve, said valve member having land means thereon for controlling the fluid flow between said ports and having a neutral position in said bore wherein said land means blocks fluid flow between said ports and movable in one direction from said neutral position to provide a fluid path through said bore to connect said load port to said drain port and in the other direction from said neutral position to provide a fluid path through said bore between said load port and said pressure port, means providing a first pressure chamber adjacent said valve member, means providing a second pressure chamber separate from said fluid paths and adjacent said valve member and preventing communication through said bore of said second chamber with said fluid paths through said bore, means for introducing fluid pressure into said first chamber and for maintaining a substantially constant pressure therein, means establishing a fluid flow through said second chamber to provide a pressure therein including first and second variable flow restricting means operable to vary the fluid flow therethrough, one of said flow restricting means controlling the fluid flow into said chamber and the other of said flow restricting means controlling the flow from said second chamber, first and second piston means responsive to the pressure in said first and second chambers respectively to urge said valve member in respective directions opposite to each other, said first flow restricting means being responsive to the movement of said valve member in one direction to decreasingly restrict the flow therethrough and in the other direction to increasingly restrict the flow therethrough, said first flow restricting means having a particular degree of restriction for each position of said valve member, said second flow restricting means including a movable control member having a neutral position wherein the flow therethrough is such that with said valve member in its said neutral position the force thereon due to the pressure in said second chamber is substantially the same as the force on said valve member due to the pressure of said first chamber, and means for moving said control member to control the position of said valve member.

15. In a servo mechanism, a control valve for controlling the operation of a hydraulic motor, said valve having fluid distribution ports including pressure, load and drain ports which open into a bore in the valve and a valve member movable in the bore in either of two opposite directions to control said ports and the distribution of fluid by said valve, said valve member having land means thereon for controlling the fluid flow between said ports and having a neutral position in said bore wherein said land means blocks fluid flow between said ports and movable in one direction from said neutral position to provide a fluid path through said bore to connect said load port to said drain port and in the other direction from said neutral position to provide a fluid path through said bore between said load port and said pressure port, means providing a first pressure chamber adjacent said valve member, means providing a second pressure chamber separate from said fluid paths and adjacent said valve member and preventing communication through said bore of said second chamber with said fluid paths through said bore, means for introducing fluid pressure into said first chamber and for maintaining a substantially constant pressure therein, means establishing a fluid flow through said second chamber to provide a pressure therein including first and second variable flow restricting means operable to vary the fluid flow therethrough, one of said flow restricting means controlling the fluid flow into said chamber and the other of said flow restricting means controlling the flow from said second chamber, first and second piston means responsive to the pressure in said first and second chambers respectively to urge said valve member in respective directions opposite to each other, said first flow restricting means being responsive to the movement of said valve member in one direction to decreasingly restrict the flow therethrough and in the other direction to increasingly restrict the flow therethrough, said first flow restricting means having a particular degree of restriction for each position of said valve member, said second flow restricting means including a movable control member having a neutral position wherein the flow therethrough is such that with said valve member in its said neutral position the force thereon due to the pressure in said second chamber is substantially the same as the force on said valve member due to the pressure of said first chamber, electrical signal responsive means for moving said control member in a direction dependent on the sense of an electrical signal applied thereto, means providing an electrical control signal for said signal responsive means, and means responsive to the displacement of said control member from its neutral position to provide an electrical signal having a magnitude and sense dependent on the magnitude and direction of the displacement of said control member from its neutral position respectively, and means applying said signal to said signal responsive means to tend to return said control member to said neutral position.

16. In a servo mechanism, a movable member movable in either of two opposite directions from a neutral position, means providing an electrical signal indicative of the direction and displacement from the neutral position of said movable member, a controlled member to be moved toward and from a neutral position in response to the first mentioned signal, a pressure chamber controlling the movement of said controlled member, the pressure of the chamber determining the direction of movement of the controlled member, means for establishing a fluid flow through said chamber to establish said pressure therein and including first and second variable flow restricting devices, one of said devices controlling the flow into said chamber and the other of said devices controlling the flow out of said chamber, means for varying said first flow control device in accordance with the position of said controlled member and increasing the restriction to fluid flow as said controlled member is moved in one direction and decreasing the restriction as said controlled member is moved in the other direction, said second flow restricting device comprising motor means responsive to said signal and having a movable element actuated from a neutral position in response to said signal and in a direction dependent upon the direction of movement of the movable member from its neutral position and a nozzle communicating with said chamber and positioned adjacent said movable element, said movable element moving toward and away from the nozzle to control the fluid flow therethrough when moved respectively in opposite directions from its neutral position, means responsive to the position of said movable element to provide an electrical signal indicative of the direction and displacement of said movable element from its neutral position corresponding to the neutral position of said movable member, and means for applying the last said signal to the motor means to render the last said signal effective to tend to return the movable element to its neutral position.

References Cited in the file of this patent

UNITED STATES PATENTS

| | | |
|---|---|---|
| 1,046,236 | Wagner | Dec. 3, 1912 |
| 2,600,348 | Walthers | June 10, 1952 |
| 2,625,136 | Moog | Jan. 13, 1953 |
| 2,674,232 | Mason | Apr. 6, 1954 |
| 2,690,192 | Dannhardt | Sept. 28, 1954 |
| 2,722,234 | MacGeorge | Nov. 1, 1955 |

FOREIGN PATENTS

| | | |
|---|---|---|
| 63,968 | Sweden | 1927 |

UNITED STATES PATENT OFFICE

CERTIFICATION OF CORRECTION

Patent No. 2,959,191 November 8, 1960

Ralph H. Schuman et al.

It is hereby certified that error appears in the above numbered patent requiring correction and that the said Letters Patent should read as corrected below.

Column 14, line 66, for "moving" read -- movable --.

Signed and sealed this 9th day of May 1961.

(SEAL)
Attest:

ERNEST W. SWIDER
Attesting Officer

DAVID L. LADD
Commissioner of Patents